Nov. 28, 1939.    A. S. LATHAN    2,181,189
GARDEN TOOL
Filed Sept. 17, 1938
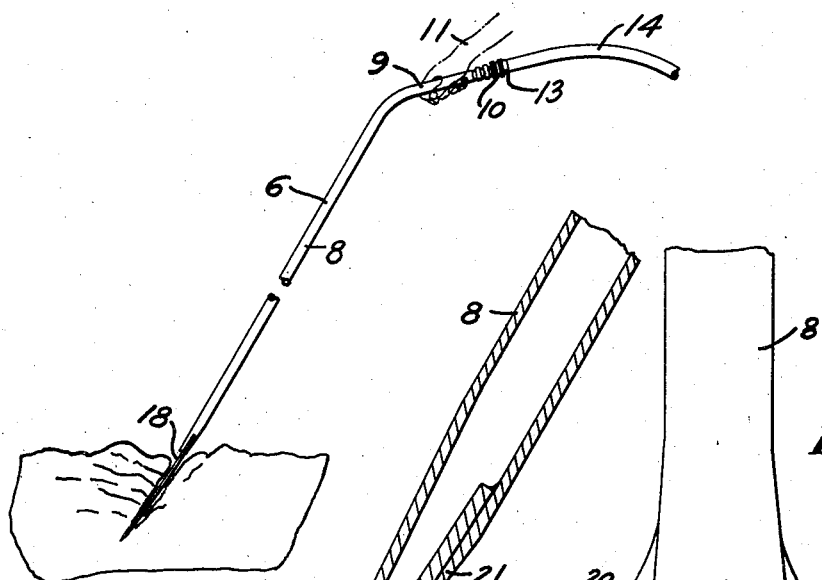
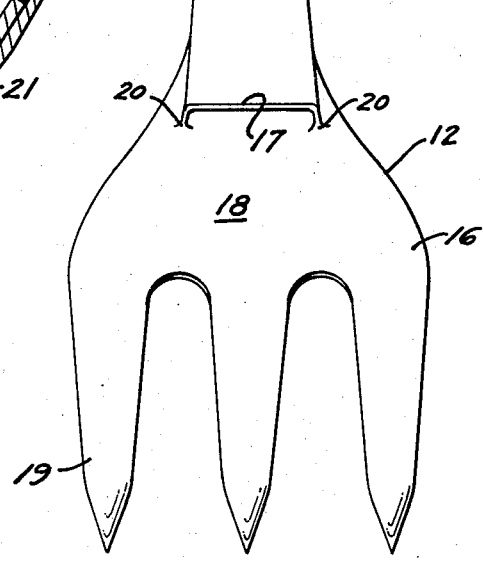
INVENTOR.
ALEXANDER S. LATHAN
BY
ATTORNEY.

Patented Nov. 28, 1939

2,181,189

UNITED STATES PATENT OFFICE 2,181,189

GARDEN TOOL

Alexander S. Lathan, San Mateo, Calif.

Application September 17, 1938, Serial No. 230,448

3 Claims. (Cl. 47—49)

My invention relates to hand tools for gardening, and particularly to a combination fork and watering tool.

A need has long existed for a light, inexpensive tool to cultivate and water gardens simultaneously. Particularly is this so in home gardens, where many different varieties of plants and flowers are grown together. The amounts of moisture required by different species may vary widely, and it is difficult to supply the right quantity to each plant. To do so with the ordinary hose or watering can is slow and awkward, especially where it is necessary to get under heavy foliage in order to apply the water to the ground.

It has been recognized that it would be desirable to combine a fork with a water outlet, so that the operations of cultivating and watering could be combined in one. In this way, also, the water is directed into the ground near the roots of the plants. This prevents accumulation of water on the surface, which tends to cake the soil, and avoids excessive loss by evaporation from pools accumulating on the hard, caked surface.

The prior art structures are cumbersome and expensive to construct. Commonly, the hose connection is applied in such a way as to interfere with the free use of the fork as a digging and cultivating implement; in some, the watering holes are likely to clog readily; in all of them the construction set forth is expensive. My structure, on the other hand, is so simple, and may be manufactured so economically, that it can be made available to every householder at slight expense. It is designed in such a way that the hose connection thereto will not interfere with the free use of the tool in digging; the tool is shaped to distribute the water properly, and clogging is unlikely.

The objects of my invention thus include forming an inexpensive combination watering and cultivating tool. Other objects are: to provide a fork having a nozzle arrangement directing water down its face; to provide a cultivating and watering tool having a watering aperture so positioned as to render it unlikely that it will be plugged up by dirt during use; and to provide a fork and watering hose structure in which the hose and handle are in alignment. A further object is to provide such a combination tool with an integrally formed handle which permits using the fork with a twisting or prying movement. Still another object is to provide a garden tool with which water may be applied to the roots of growing plants during cultivation; to provide a watering device which will distribute the water in such a way as to insure adequate horizontal as well as vertical dissemination; to provide a cultivating tool which will apply water underneath the surface; and to provide such a tool in a form which will eliminate the likelihood of splashing the user.

The invention possesses other objects and features of advantage, some of which, with the foregoing, will be set forth in the following description of the preferred forms of my invention which are illustrated in the drawing accompanying and forming a part of the specification. It is to be understood that I do not limit myself to the showing made by the drawing and description as I may adapt a variation of the preferred forms within the scope of my invention as set forth in the claims.

My invention may be better understood by reference to the drawing wherein:

Fig. 1 shows a side view of my tool indicating the proper manner of use;

Fig. 2 is a sectional view; and

Fig. 3 is a plan view showing the details of the nozzle construction.

It is to be understood that the parts as shown in the drawing are susceptible of modification and that I do not wish to be limited to the exact structural elements or the arrangement shown.

In Fig. 1 I have my tool, indicated generally by the numeral 6, and having a long tubular shaft 8 which is bent at one end to form a handle 9. Handle 9 terminates in a female hose coupling 10 to which may be attached by an ordinary male coupling 13 a hose 14.

If desired, the couplings 10 and 13 may be omitted, the end of handle 9 ribbed, and the hose 14 fixed permanently thereon by suitable clamps.

At the opposite end of shaft 8 I attach a fork, generally designated by 12. Fork 12 has a flat body portion 16 and tines 19. The end of shaft 8 is flattened to form a rectangular nozzle 17, and slotted to permit entry of fork body portion 16. The shaft and fork are then secured by welding or brazing 20. The fork is welded in such position that the nozzle directs water only over the face 18 of the fork which will be directed away from the user. Additional strength may be secured by welding the portion 21 of shaft 8 extending down body 16 on the side thereof opposite face 18.

The handle 9 extends substantially at right angles to the face 18 of the fork, and it will be seen from Fig. 1 that this position is particularly advantageous in affording maximum leverage in using the fork.

In operation the tool is used as an ordinary fork, with the addition that water is applied through the hose connection in any desired volume by a suitable control valve (not shown). Hence, after the ground is cultivated, the water is applied beneath the top crust or surface and permitted to spread itself evenly underneath. It will be appreciated by those familiar with gardening that a dual advantage is obtained in applying the water in this position since an adequate horizontal distribution beneath the surface is secured. Particularly is this true when the fork is driven in vertically and the handle pulled backward, leaving a gap in which the water may pour for adequate horizontal distribution. When the surface is caked, as frequently occurs, and water is applied above the surface, its downward penetration may be substantially along the cracks, and it may not spread out horizontally as far as desired. It will also be apparent that this structure provides a simple means of adequately watering terraced or sloping ground inasmuch as the water applied below the surface will be well distributed through the ground instead of running off without soaking.

I have shown the body of my fork shaped in such a way that it is not suited for the usual foot pressure, the ornamental design shown forming the subject matter of my co-pending design application Serial No. D-79,963, filed September 17, 1938. I intend to form the fork of relatively light material, having in mind that this tool will be used particularly in flower beds and similar garden plots where a large amount of heavy digging is not required, but where cultivation is required in limited spaces. By making the tool light and small, I have made it more suitable to use with the hands only, and I do not intend that the form shown shall be used for extremely heavy work. It is, however, within the province of my invention to make a similar fork on an enlarged scale for heavy use, by truck farmers, commercial gardeners and the like, and in such case I might modify the form of the fork body to enable it to be used with the feet for heavy work.

From the description above it will be apparent that I have invented a novel garden tool which can be readily used in restricted spaces, and which enables the simultaneous cultivation of the soil and watering of the plants around which the soil is being cultivated. As I have shown, the tool forming my invention has a structure which is particularly useful in restricted spaces and on sloping or terraced ground, and is so designed that the water may be applied to the roots of the plants rather than to the leaves.

It will also be seen that the arrangement shown is most convenient in allowing maximum leverage in use, and that the hose connection is in a position to balance the fork, rather than to interfere with its free manipulation, and that the possibility of splashing the user is minimized.

Those skilled in the art will see also that other working heads, such as a spade or the like, might be substituted for the fork shown in the drawing.

Hence, I do not wish to be limited to the exact shape, arrangement or method of assembling the elements set forth and it is to be understood that my invention may be modified for special uses within the scope of the appended claims.

What I claim is:

1. A gardening tool, comprising a tubular body bent at one end to form a handle, a hose connection formed on said handle; a slotted, flattened section terminating the opposite end of said body, a flat fork body arranged to engage said slotted section and to be secured thereto, flat tines extending from said fork body, and a nozzle formed by said flattened body section arranged to direct water over said fork body and tines.

2. A gardening tool, comprising a tubular body bent at one end to form a handle, a hose connection formed on said handle; a slotted, flattened section terminating the opposite end of said body, a flat fork body arranged to engage and be secured to said slotted section, curved tines having substantially flat faces extending from said fork body; and a nozzle formed by said flattened tubular body portion arranged to direct water over said fork body and tines.

3. A gardening tool, comprising a tubular body bent at one end to form a handle, a hose connection formed on said handle; a slotted, flattened section terminating the opposite end of said body, a flat fork body arranged to engage and be secured to said slotted section, curved tines having substantially flat faces extending from said fork body; and a nozzle formed by said flattened tubular body portion arranged to direct a vertical sheet of water over said fork body and tines.

ALEXANDER S. LATHAN.